US008499141B2

(12) United States Patent
Swanson et al.

(10) Patent No.: US 8,499,141 B2
(45) Date of Patent: Jul. 30, 2013

(54) MULTI-SOCKET SERVER MANAGEMENT WITH RFID (75) Inventors: Robert C. Swanson, Olympia, WA (US); Vincent J. Zimmer, Federal Way, WA (US); Mallik Bulusu, Olympia, WA (US); Michael A. Rothman, Puyallup, WA (US); Palsamy Sakthikumar, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 221 days.

(21) Appl. No.: 12/848,654

(22) Filed: Aug. 2, 2010

(65) Prior Publication Data
US 2012/0025953 A1 Feb. 2, 2012

(51) Int. Cl.
*G06F 15/177* (2006.01)
*G06F 9/00* (2006.01)
*H04Q 5/22* (2006.01)

(52) U.S. Cl.
USPC .................................. 713/1; 713/2; 340/10.1

(58) Field of Classification Search
USPC ........................................................ 713/1, 2
See application file for complete search history.

(56) References Cited

U.S. PATENT DOCUMENTS

| 6,748,544 | B1 | 6/2004 | Challener et al. |
| 6,832,320 | B1 | 12/2004 | Broyles et al. |
| 7,430,398 | B2 * | 9/2008 | Ban et al. ..................... 455/41.2 |
| 7,612,674 | B2 * | 11/2009 | Shintani .................... 340/572.2 |
| 8,042,731 | B2 * | 10/2011 | Skaistis et al. ............... 235/375 |
| 8,065,443 | B1 | 11/2011 | White et al. |
| 2002/0140966 | A1 | 10/2002 | Meade, II et al. |
| 2005/0086553 | A1 | 4/2005 | Spencer |
| 2006/0071793 | A1 | 4/2006 | Pesavento |
| 2006/0145813 | A1 | 7/2006 | Haller et al. |
| 2007/0096876 | A1 | 5/2007 | Bridgelall et al. |
| 2007/0200708 | A1 | 8/2007 | Hayama et al. |

(Continued)

FOREIGN PATENT DOCUMENTS

| EP | 1909517 | 4/2008 |
| GB | 2434442 | 7/2007 |

(Continued)

OTHER PUBLICATIONS

International Search Report and Written Opinion received for PCT Application No. PCT/US2011/044334 mailed on Mar. 12, 2012, 8 pages.

(Continued)

*Primary Examiner* — Suresh Suryawanshi
(74) *Attorney, Agent, or Firm* — Grossman, Tucker, Perreault, Pfleger, PLLC (57) ABSTRACT

Radio frequency identification (RFID) tags embedded in processors within a computing system provide a separate communication path to other components of the computing system during initialization processing, apart from the system interconnect. Upon powering up, each processor causes its RFID tag to broadcast data regarding the processor's interconnect location and initialization status. A RFID receiver senses the RFID tags in the Platform Control Hub (PCH), and each processor's interconnect location and initialization status data is stored in registers within the PCH. During system initialization processing, the BIOS accesses these PCH registers to obtain the processor's data. The interconnect location and initialization status data is used by the BIOS to select the optimal routing table and configure the virtual network within the computing system based on the optimal routing table and the RFID tag data, without interrogating each processor individually over the system interconnect.

19 Claims, 5 Drawing Sheets

U.S. PATENT DOCUMENTS

| | | |
|---|---|---|
| 2007/0247317 A1 | 10/2007 | Farrell |
| 2007/0285239 A1 | 12/2007 | Easton et al. |
| 2008/0183671 A1 | 7/2008 | Chaves |
| 2008/0278290 A1 | 11/2008 | Ban et al. |
| 2009/0008443 A1 | 1/2009 | Levovitz et al. |
| 2009/0037899 A1 | 2/2009 | Dharap et al. |
| 2009/0121018 A1 | 5/2009 | Bauchot et al. |
| 2010/0070680 A1 | 3/2010 | Luo et al. |
| 2010/0148931 A1* | 6/2010 | Pappu et al. ............... 340/10.2 |
| 2011/0121065 A1 | 5/2011 | Shahidzadeh et al. |

FOREIGN PATENT DOCUMENTS

| | | |
|---|---|---|
| JP | 2001-43088 A | 2/2001 |
| JP | 2005-011008 | 1/2005 |
| JP | 2007-25903 A | 2/2007 |
| JP | 2008-129911 | 6/2008 |
| JP | 2008-257486 | 10/2008 |
| WO | 2005/116919 | 12/2005 |
| WO | 2006104354 | 10/2006 |
| WO | 2008041978 | 4/2008 |

OTHER PUBLICATIONS

Office Action received for Japanese Patent Application No. 2010-212501, mailed on Jul. 24, 2012, 7 pages of Office Action including 4 pages of English Translation.

Examination Report received for United Kingdom Patent Application No. 1016018.2, mailed on Jan. 17, 2012, 2 Pages.

Combined Search and Examination Report received for United Kingdom Patent Application No. 1016018.2, mailed on Jan. 19, 2011, 6 Pages.

Combined Search and Examination Report received for United Kingdom Patent Application No. 1120918.6, mailed on Dec. 22, 2011, 5 Pages.

Non Final Office Action Received for the U.S. Appl. No. 12/592,212, mailed on May 23, 2012, 21 pages.

Notice of Allowance Received for the U.S. Appl. No. 12/592,212, mailed on Sep. 17, 2012, 14 pages.

International Preliminary Report on Patentability from related application PCT/US11/044334 dated Feb. 5, 2013.

* cited by examiner

| START NODE | NEXT HOP/DESTINATION | | START NODE | NEXT HOP/DESTINATION | |
|---|---|---|---|---|---|
| 0 | 1 |   | 4 | 1 | 0 |
| 0 | 2 |   | 4 | 1 |   |
| 0 | 1 | 3 | 4 | 5 | 2 |
| 0 | 1 | 4 | 4 | 6 | 3 |
| 0 | 2 | 5 | 4 | 5 |   |
| 0 | 7 | 6 | 4 | 6 |   |
| 0 | 7 |   | 4 | 5 | 7 |
| 1 | 0 |   | 5 | 7 | 0 |
| 1 | 0 | 2 | 5 | 4 | 1 |
| 1 | 3 |   | 5 | 2 |   |
| 1 | 4 |   | 5 | 2 | 3 |
| 1 | 4 | 5 | 5 | 4 |   |
| 1 | 3 | 6 | 5 | 4 | 6 |
| 1 | 0 | 7 | 5 | 7 |   |
| 2 | 0 |   | 6 | 7 | 0 |
| 2 | 3 | 1 | 6 | 4 | 1 |
| 2 | 3 |   | 6 | 3 | 2 |
| 2 | 5 | 4 | 6 | 3 |   |
| 2 | 5 |   | 6 | 4 |   |
| 2 | 3 | 6 | 6 | 7 | 5 |
| 2 | 0 | 7 | 6 | 7 |   |
| 3 | 2 | 0 | 7 | 0 |   |
| 3 | 1 |   | 7 | 0 | 1 |
| 3 | 2 |   | 7 | 5 | 2 |
| 3 | 1 | 4 | 7 | 6 | 3 |
| 3 | 2 | 5 | 7 | 6 | 4 |
| 3 | 6 |   | 7 | 5 |   |
| 3 | 6 | 7 | 7 | 6 |   |

MULTI-SOCKET SERVER MANAGEMENT WITH RFID

BACKGROUND

1. Field

The present invention relates generally to computer systems and, more specifically, to initialization and management of servers having multiple processors.

2. Description

Computing systems are becoming increasingly complicated. as computing systems include more processors, more sockets, and more intricate interconnect schemes, initialization processing becomes burdensome and time consuming.

For server systems having multiple processors, such as 4-way and 8-way systems (without loss of generality), for example, the time and effort to determine the valid network of processors within the fabric during system initialization processing is growing. In some computing systems, significant portions of this increased initialization processing have been pushed to the Basic Input/Output System (BIOS) firmware for handling. Implementing system topology discovery tasks using the BIOS to query processors over the system interconnect is inefficient, but necessary in current systems. As computing systems expand to even higher numbers of processors and server components on the fabric, this expanding initialization processing time and effort negatively impacts performance of system booting.

BRIEF DESCRIPTION OF THE DRAWINGS

The features and advantages of the present invention will become apparent from the following detailed description of the present invention in which.

DETAILED DESCRIPTION

An embodiment of the present invention is a system and method of using radio frequency identification (RFID) tags embedded in processors within a computing system to assist in system initialization processing. The RFID tags provide a separate communication path to other components of the computing system during initialization processing, apart from the system interconnect. When the computing system is powered up, each processor in the system may cause its RFID tag to broadcast data regarding the processor's interconnect location and initialization status. In one embodiment, the RFID tags may be sensed by a RFID receiver in the Platform Control Hub (PCH) of the computing system, and each processor's interconnect location and initialization status data may be stored in selected registers within the PCH. When the BIOS executes during system initialization processing, the BIOS may access these PCH registers to obtain the processor's data. The interconnect location and initialization status data may be used by the BIOS to select the optimal routing table and to configure the virtual network within the computing system based at least in part on the optimal routing table and the RFID tag data and without the need for interrogating each processor individually over the system interconnect. This results in improved system boot times and ensures optimal deadlock free routing is used for the interconnect. Deadlock free routing may be important when systems providing increased RAS (reliability, availability, and serviceability) are deployed.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

In one embodiment, the present invention may be implemented in computing systems supporting Quick Path Interconnect (QPI) technology commercially available from Intel Corporation, although other system interconnects may also be used. QPI is a high-speed, packetized, point-to-point interconnect used with certain Intel processors. The narrow high-speed links allow processors to communicate in a distributed shared memory-style platform architecture. Compared with earlier front side bus architectures, QPI provides much higher bandwidth with low latency. QPI has an efficient architecture allowing more interconnect performance to be achieved than previous technologies. It provides a snoop protocol optimized for low latency and high scalability, as well as packet and lane structures enabling quick completions of transactions. Reliability, availability, and serviceability (RAS) features are built into the architecture to meet the needs of mission-critical servers.

The beginning of the computing system initialization process is to apply power, stabilize all critical clocking circuits, and then control the release of various reset signals so that the computing system will begin operation in a predictable and controlled manner. In this context, reset is defined to be a set of hardware-based events that establishes an initial hardware state. Initialization is defined to be the set of instruction sequences that follow reset and which prepare the hardware for the execution of boot firmware. The boot firmware (or BIOS) then prepares the system for the loading of and transferring control to an operating system (OS). One goal of these hardware and boot firmware activities is to get their tasks completed efficiently so control can be handed to the OS as soon as possible. This is important for systems that must fall within the 4 or 5 9's of reliability. On those systems, only one or two system boots are allowed within a calendar year. It is imperative that the system boot process be fast as possible to allow the system administrator greater flexibility for servicing the computing system.

When the computing system first comes out of reset and the BIOS starts executing, one of the tasks is to discover what resources are available and how they are interconnected. Various hardware functions play a role in this, as do bootstrap processors while they configure the processor sockets individually. It is the system bootstrap processor (SBSP) however that then examines the information it has available, and goes through a methodical process to determine what resources exist, which ones are functional, if the resources are in a degraded state, and then configures those resources in preparation for the OS in an optimal and reliable manner. This process is referred to as topology discovery.

In existing systems, during system initialization, QPI topology discovery is performed by software resident in a power control unit (PCU) of a processor. However, topology discovery can be performed in this manner only for processors that are within two hops away from the BIOS on the QPI network. In an example system having eight sockets and up to eight processors configured in a "pin-wheel" or ring architecture, this typically means that six sockets cannot have their QPI links configured by the Pcode running on the PCUs of the processors connected to those sockets. Instead, the BIOS must configure the QPI links for those six processors as part of QPI discovery processing. To do this, the BIOS must discover each QPI link in the system interconnect, train the link for a slow mode of operation if the link is not directly connected to the processor executing the BIOS, discover any additional processor socket capabilities (such as support for virtual network (VN) 0 or VN1), ensure that there are no deadlocks in the discovered QPI routing topology, ensure that the topology is optimal based on the links discovered, ascertain if there are any errors with the QPI links, and finally train all of the links for fast operational mode. BIOS QPI discovery processing typically take tens of minutes to run (for example on current 4-way and 8-way systems), and in some cases only ensures deadlock free routing, but not optimal QPI configuration. Additionally, the BIOS has no way to know if a processor installed on remote sockets has failed any aspect of the processor's built-in self-test (BIST) until after topology discovery is complete.

Figure 1:
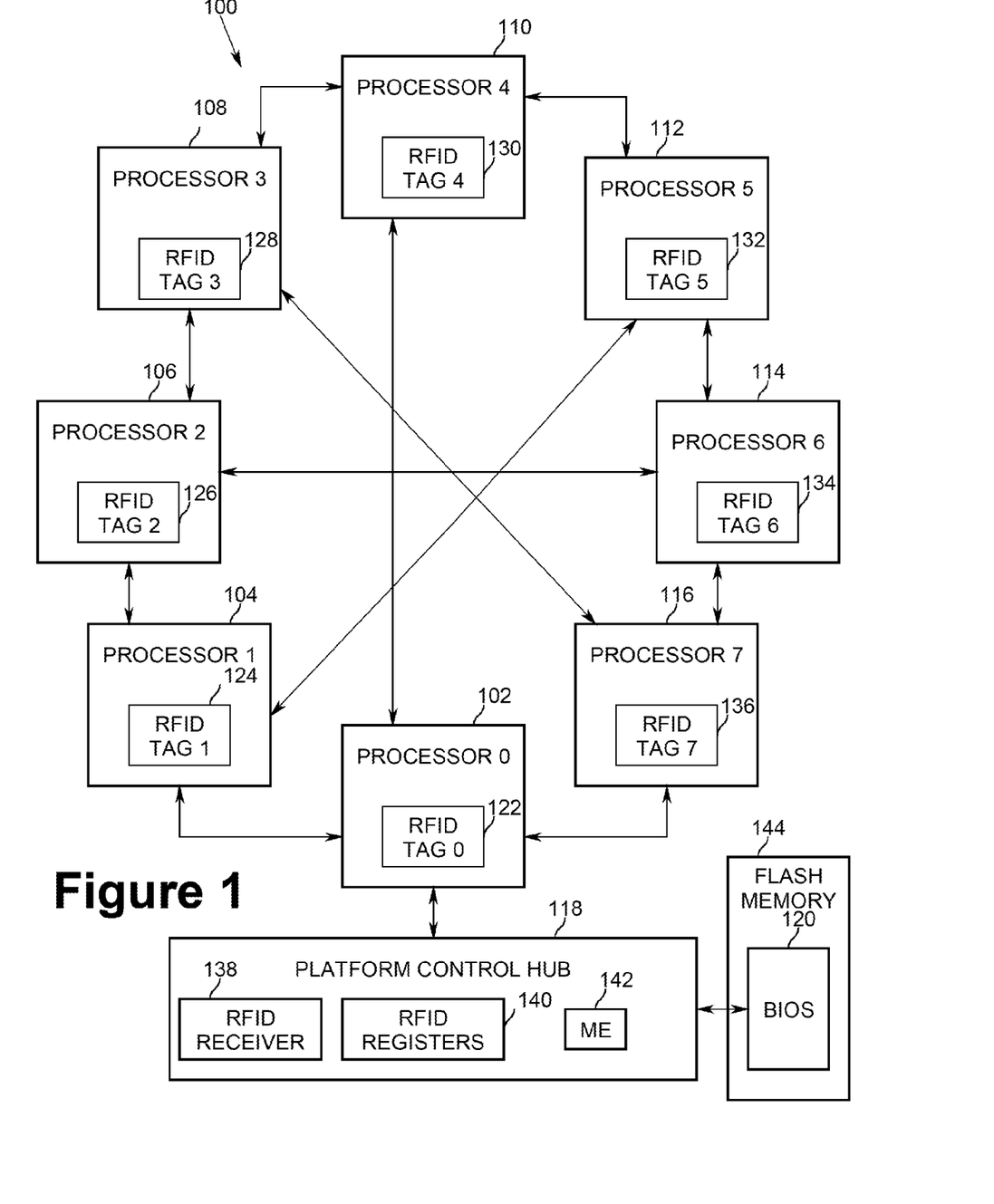
FIG. 1 is a diagram of a computing system according to an embodiment of the present invention.

Embodiments of the present invention improve the topology discovery process for system interconnects by using RFID tags embedded in processors. FIG. 1 is a diagram of a computing system according to an embodiment of the present invention. Computing system 100 shows eight processors in a specific configuration, however in other computing systems different numbers of processors and different configurations may be used. Each processor in computing system 100 is connected to a physical socket (not shown) in a motherboard. In some implementations, there may be fewer processors installed than available sockets. For example, the computing system may provide eight sockets, but only six of the sockets may be populated by processors. Discovering which sockets have processors installed, and which of those processors are initialized and functional, may be performed according to embodiments of the present invention. As shown in the example configuration of FIG. 1, computing system 100 includes processor 0 102, processor 1 104, processor 2 106, processor 3 108, processor 4 110, processor 5 112, processor 6 114, and processor 7 116. Each processor comprises a power control unit (PCU) (not shown) for controlling power-up and initialization of the processor. In one embodiment, a socket may only have three links. Accordingly, processor 0 102 may have a link to processor 1 104, processor 7 116, and processor 4 110, in this example system configuration. Processor 1 104 may have a link to processor 0 102, processor 2 106, and processor 5 112. The other processors may have links as shown.

In the example configuration shown in FIG. 1, processor 0 102 may also be used as the system boot strap processor (SBSP) and have a direct media interface (DMI) connection to platform control hub (PCH) 118. PCH 118 comprises a chipset component to control communications and operations of other components (not shown for simplicity) in the computing system. The PCH controls the power initialization sequencing of the computing system. PCH 118 includes a Manageability Engine (ME) 142. The ME comprises a microcontroller to allow remote access and management of the computing system, even if the system is turned off. ME 142 may communicate with the processors over sideband communication channels and other computing platforms over a network (not shown in FIG. 1). Computing system 100 also includes flash memory 144 coupled to the PCH over a serial peripheral interface (SPI), which stores BIOS 120. In one embodiment, BIOS 120 executes on a processing core of processor 0 102. Typically, during system initialization processing, the ME and PCUs within processors execute before the BIOS.

In embodiments of the present invention, each processor comprises an RFID tag. As shown in FIG. 1, processor 0 102 includes RFID tag 0 122, processor 1 104 includes RFID tag 1 124, processor 2 106 includes RFID tag 2 126, processor 3 108 includes RFID tag 3 128, processor 4 110 includes RFID tag 4 130, processor 5 112 includes RFID tag 5 132, processor 6 114 includes RFID tag 6 134, and processor 7 116 includes RFID tag 7 136. Each RFID tag transmits data about the processor over an RF signal as is conventionally known. PCH 118 comprises RFID receiver 138 for receiving the RF signals from the RFID tags. Each RFID tag's data uniquely identifies the processor in which the RFID tag is embedded. Embedding RFID tags into processors is described in the US patent application entitled "Radio-Frequency Reconfigurations of Microelectronic Systems in Commercial Packages" by Shahidzadeh et al., Ser. No. 12/592,212, filed Nov. 20, 2009, assigned to the same assignee as the present invention, and incorporated herein by reference.

RFID receiver 130 receives the RF signals and transfers the RFID tag data contained in the RF signals to the PCH. The PCH determines which processor the RFID tag data is from, and stores the RFID tag data into a selected one or more RFID registers 140 within the PCH. Once the data from one or more processors is stored in the RFID registers, ME 142 and BIOS 120 may access the RFID registers and use the data for system initialization purposes, including determining the system interconnect topology and discovery. Since this data is accessible early in the system power-up process, overall system initialization time may be decreased, because the ME and/or the BIOS may use the available data when performing system initialization tasks (such as determining optimal routing configuration) instead of explicitly and separately interrogating processors over the QPI links. Determining optimal deadlock free routing is typically a difficult problem to solve for servers with four or more processors, but in embodiments of the present invention, if the ME and/or the BIOS know which processors are installed prior to discovery, lookup tables may be used for the routing instead of a complicated and time consuming crawling algorithm.

In other embodiments, the RFID registers may be accessed by a baseband management controller (BMC) via a total cost of ownership (TCO) port into a south bridge chipset (I/O control hub (ICH)).

Figure 2:
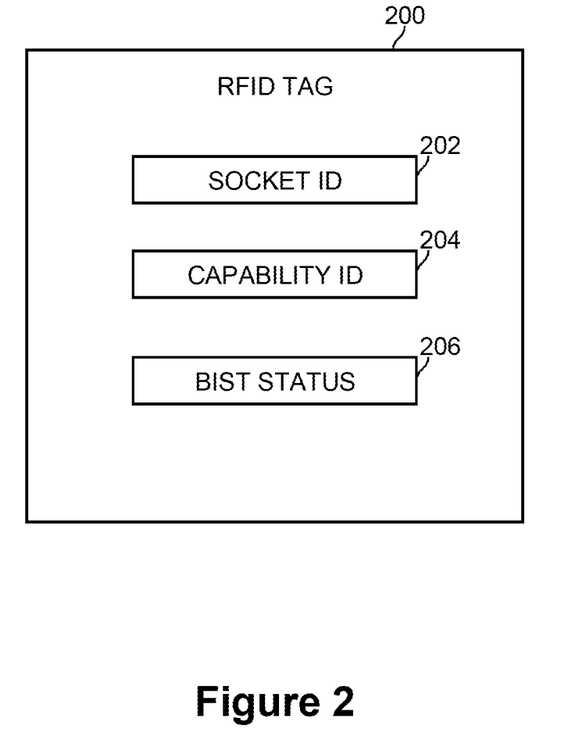
FIG. 2 is a diagram illustrating the contents of an RFID tag according to an embodiment of the present invention.

FIG. 2 is a diagram illustrating the contents of an RFID tag 200 according to an embodiment of the present invention. In one embodiment, the RFID tag includes the following data fields. In other embodiments, other data relating to a processor may also be stored in the RFID tag and transmitted to the PCH. Socket identifier (ID) 200 may be a number that uniquely identifies the processor socket on the motherboard in which the processor transmitting the RFID tag is physically situated. In one embodiment having eight sockets, a socket ID may be any number from 0 to 7. In other embodiments, other numbers or indicators identifying the socket may be used. Capability ID 204 may define the capabilities of the processor, and may include a central processing unit (CPU) ID.

Built-in Self-Test (BIST) status 206 includes results of BIST processing for the processor, including cache results, I/O results, etc. BIST results may be determined by the processor as a result of power-up. When the processor includes multiple cores, the BIST status may include BIST results for each core (i.e., core-specific BIST results). Including the BIST results in the RFID tag data provides an advantage over current methods and systems which provide for the processor loading BIST results into an EAX register within the processor, the EAX register being accessible only by the BIOS (upon first BIOS code fetch and only for local BIST results, not remote BIST results) over the QPI link (which can only be used after system interconnect topology and discovery processing are complete). Remote BIST results are not visible until after processor discovery via the QPI links and the SBSP firmware agent has been selected. However, in embodiments of the present invention, storing the BIST results in the RFID registers in the PCH allow the BIOS early access to the BIST results without having to interrogate the processor directly. This results in faster power-on self-test (POST) operation for systems having greater than 4 sockets and allows for an optimal routing to be chosen before discovery. In FRB (Fault Resilient Booting) scenarios, the BIOS needs to know which CPU cores and cache slices failed its associated BIST test. The BIOS will disable any core or cache slice that fails the test, but it requires a reset. Using embodiments of the present invention, the BIOS will know which cores and cache slices must be disabled which will allow the coalescing of resets into a singular event. In addition, because BIOS now knows the core or cache slices which are in error prior to ever utilizing them for POST or platform operation, it can be disabled without risking runtime errors. This will directly result in a more stable and robust platform as code will not be executed on faulty hardware.

Additionally, from the socket ID and the capability ID, the BIOS may be able to associate the node ID and, prior to discovery, know which processors are installed in the computing system, the number of QPI links possible, and the correct deadlock free routing. This allows the BIOS to maintain a table of the optimal routing for each supported RAS mode based on the dynamically changing topology of the computing system and the processor's BIST results. This may be done during initial architectural BIOS fetch, but before QPI discovery. There may be more than one node ID (each corresponding to a logical processor) per socket. BIST results may be zero (indicating no errors) or non-zero (indicating the error in the processor occurring during BIST).

Figure 3:
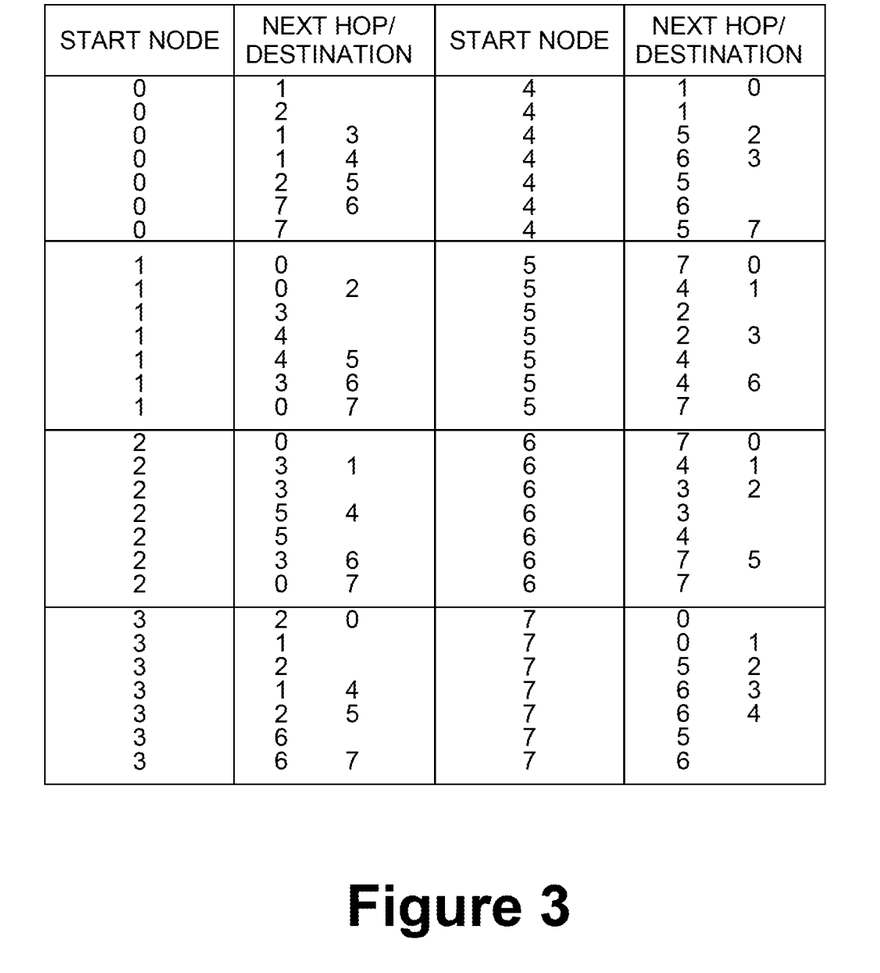
FIG. 3 is a diagram illustrating an example routing table according to an embodiment of the present invention.

FIG. 3 is a diagram illustrating an example routing table according to an embodiment of the present invention. There may be any number of routing tables stored in the computing system. In one embodiment, there may an optimal routing table predetermined for each unique number of processors installed in the computing system. For example, if the number of processors installed is eight, than a predetermined optimal routing table may be selected. If the system configuration is changed (for example, if one or more of the processors fails and is not operational), a different optimal routing table corresponding to the new configuration may be selected. The optimal routing tables may be predetermined and stored in the flash memory or in the PCH. Usage of certain sockets when the number of installed processors is less than the maximum number of processors supported by the computing system may be prescribed by usage rules.

In an embodiment, to achieve deadlock free routing using the example topography requires two virtual networks (VN0 and VN1). In an embodiment, messages originating at even numbered nodes use VN0, messages originating at odd numbered nodes use VN1, and messages traversing the last hop to the destination switch over to VN0.

Figure 4:
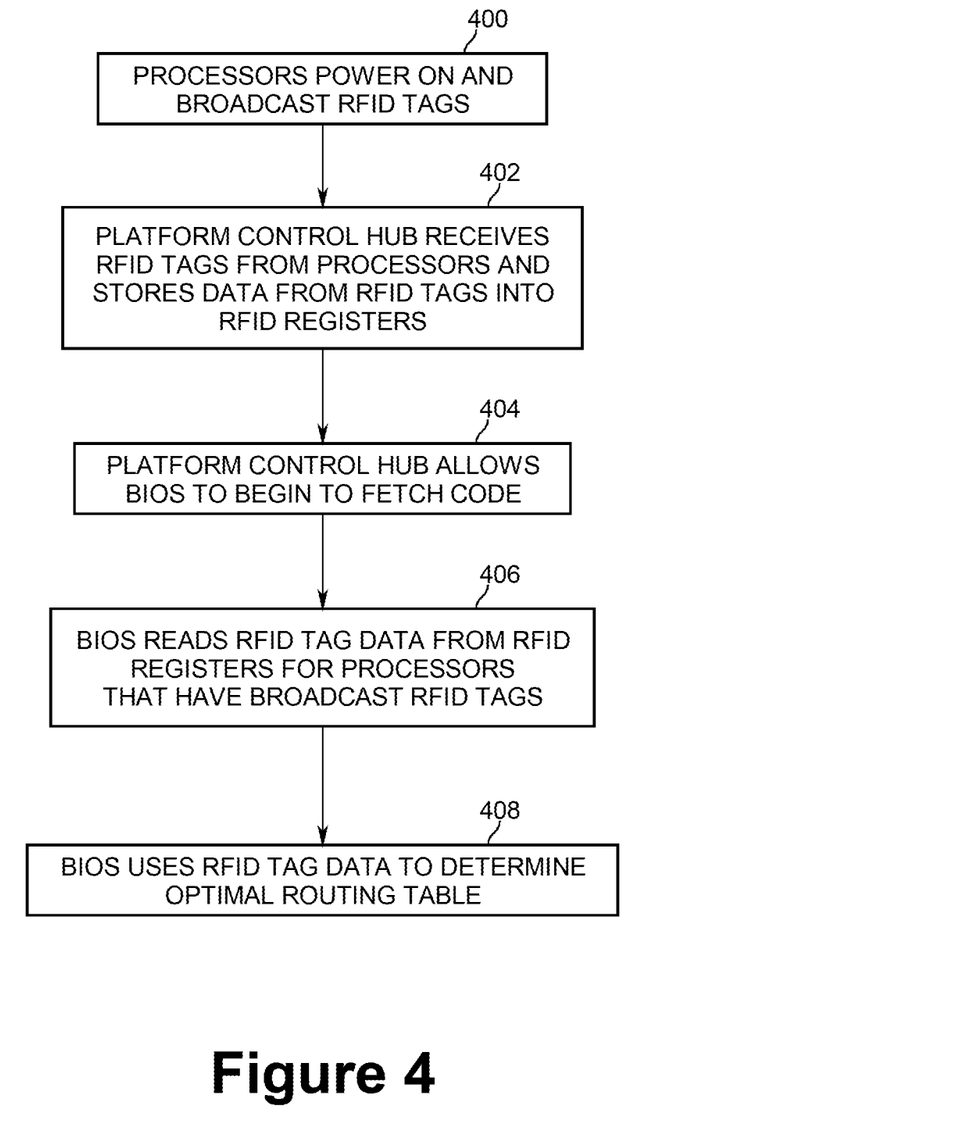
FIG. 4 is a flow diagram of system initialization processing according to an embodiment of the present invention.

FIG. 4 is a flow diagram of system initialization processing according to an embodiment of the present invention. At block 400, PCH 118 causes each of the processors in the system to start their power on sequences. In one embodiment, this may be initiated by asserting a XXRESET signal to each processor. Each processor performs BIST. Each processor stores at least the BIST results, its socket ID, and its capability ID into its RFID tag, and broadcasts the RFID tag according to known RF methods. At block 402, the PCH receives the RFID tags from the processors in RF signals sensed by RFID receiver 138, and stores the RFID tag data into RFID registers 140. In one embodiment, there may be a set of RFID registers associated with each socket. When there is no data stored in the RFID registers associated with a socket, the BIOS may infer that there was an error in powering up that processor, or the socket is empty. Once the RFID tag data is stored, the PCH 118 may, in one embodiment, de-assert the XXRESET signal, thereby allowing the BIOS to begin fetching code from the flash memory at block 404. Next, at block 406 the BIOS 120 executes and reads the RFID tag data from the RFID registers 140 for processors that have broadcast their RFID tags. At block 408, the BIOS uses the RFID tag data to determine the optimal routing table based on the available processor characteristics, populated sockets, and BIST results.

The BIOS may also use the RFID tag data to further configure the computing system. For example, if the RFID tag data indicates that certain sockets are not populated with processors, attempts to initialize those empty sockets may be avoided. In another example, if a computing system user selects a RAS topology that is not possible for the currently configured system, the BIOS will be able to indicate this to the user immediately.

Figure 5:
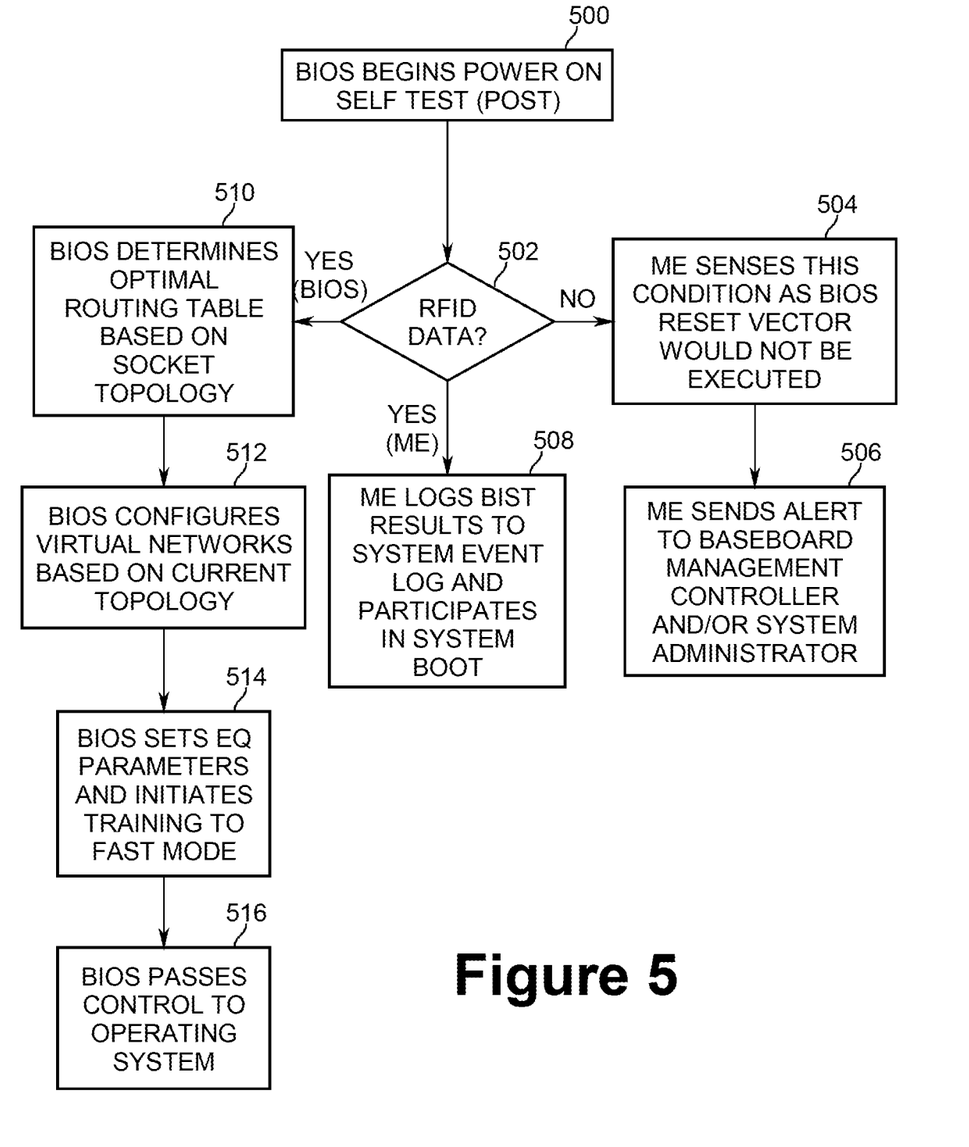
FIG. 5 is a flow diagram of system initialization processing according to an embodiment of the present invention.

FIG. 5 is a flow diagram of system initialization processing according to an embodiment of the present invention. FIG. 5 describes BIOS and Manageability Engine (ME) processing of the RFID tag data. At block 500, the BIOS begins power-on self-test (POST) processing. As part of POST, the BIOS checks the RFID registers 140 to see if RFID tag data from processors has been stored. If there is no RFID tag data, the ME senses this condition as the BIOS reset vector would not have been executed at block 504. This might mean that one or more of the processors or processor cores failed to power-up correctly, or that the system interconnect link to that processor failed to initialize. At block 506, the ME sends an alert to a baseband management controller (BMC) and/or system administrator to report the error. If RFID tag data is detected at block 502, then the ME logs the BIST results for each processor into a system event log and participates in the normal system booting process at block 508. If RFID tag data is detected at block 502, then the BIOS at block 510 determines the optimal routing table based on the socket topology known from the stored RFID tag data. At block 512, the BIOS configures the QPI virtual networks for the computing system based on the current topology. Next, at block 514 the BIOS sets equalization (EQ) parameters for the physical and electrical characteristics of the QPI links and initiates training of the QPI links to QPI fast mode. At block 516, the BIOS passes control to the OS.

In other embodiments, the present invention may be implemented in computing systems supporting system interconnect technologies other than QPI, such as HyperTransport (HT) as defined by the HyperTransport Consortium, or other interconnects.

Although the following operations may be described as a sequential process, some of the operations may in fact be performed in parallel or concurrently. In addition, in some embodiments the order of the operations may be rearranged.

The techniques described herein are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, set top boxes, cellular telephones and pagers, and other electronic devices, that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various computer system configurations, including multiprocessor systems, minicomputers, mainframe computers, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by a machine and that cause the machine to perform any one of the methods described herein. The term "machine readable medium" shall accordingly include, but not be limited to, solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action and produce a result.

What is claimed is:

1. A computing system comprising:
   a plurality of processors, each processor including a radio frequency (RF) identification (ID) tag to broadcast RFID tag data associated with the processor over a RF signal, each processor being coupled to a plurality of other processors over a system interconnect;
   a platform control hub (PCH) coupled to at least one of the processors, the PCH including a RFID receiver to receive RF signals from RFID tags on the processors, and a plurality of RFID registers to store RFID tag data received from the processors; and
   a flash memory coupled to the PCH to store a basic input/output system (BIOS), the BIOS to read the RFID tag data from the RFID registers in the PCH to determine an optimal routing table for the system interconnect.

2. The computing system of claim 1, wherein the RFID tag data comprises a processor's interconnect location and initialization status.

3. The computing system of claim 2, wherein the RFID tag data comprises a capability ID for the processor and the interconnect location comprises a socket ID.

4. The computing system of claim 2, wherein the initialization status comprises built-in self-test (BIST) status for the processor.

5. The computing system of claim 4, wherein the PCH further comprises a microcontroller to store a processor's BIST status into a system event log when RFID tag data is available in the RFID registers for the processor and send an alert to a baseband management controller of the computing system when RFID tag data is not available in the RFID registers for the processor.

6. The computing system of claim 1, wherein the BIOS configures a virtual network for the system interconnect based at least in part on the optimal routing table without interrogating each processor over the system interconnect.

7. The computing system of claim 6, wherein the BIOS sets equalization parameters for system interconnect links and initiates training of the links to fast mode.

8. The computing system of claim 1, wherein the system interconnect comprises a Quick Path Interconnect.

9. A method of initializing a computing system comprising;
   powering on each one of a plurality of processors in the computing system, each processor including a radio frequency (RF) identification (ID) tag, each processor being coupled to a plurality of other processors over a system interconnect;
   broadcasting, by the RFID tag in each processor, RFID tag data associated with the processor over a RF signal;
   receiving, by a RFID receiver in a platform control hub (PCH) coupled to at least one of the processors, RF signals from RFID tags on the processors;
   storing the RFID tag data from the RF signals in a plurality of RFID registers in the PCH; and
   reading, by a basic input/output system (BIOS), the RFID tag data from the RFID registers and using the RFID tag data to determine an optimal routing table for the system interconnect.

10. The method of claim 9, wherein the RFID tag data comprises a processor's interconnect location and initialization status.

11. The method of claim 10, wherein the RFID tag data comprises a capability ID for the processor and the interconnect location comprises a socket ID.

12. The method of claim 10, wherein the initialization status comprises built-in self-test (BIST) status for the processor.

13. The method of claim 12, wherein the PCH comprises a microcontroller, the microcontroller logging a processor's BIST status into a system event log when RFID tag data is available in the RFID registers for the processor and sending an alert to a baseband management controller of the computing system when RFID tag data is not available in the RFID registers for the processor.

14. The method of claim 9, further comprising the BIOS configuring a virtual network for the system interconnect based at least in part on the optimal routing table without interrogating each processor over the system interconnect.

15. The method of claim. 14, further comprising the BIOS setting equalization parameters for system interconnect links and initiating training of the links to fast mode.

16. The method of claim 15, further comprising the BIOS passing control to an operating system (OS).

17. The method of claim 9, wherein the system interconnect comprises a Quick Path Interconnect.

18. The method of claim 9, further comprising the BIOS determining the optimal routing table during power-on self-test (POST) mode.

19. The method of claim 12, further comprising the BIOS accessing the processor's BIST status without interrogating the processor over the system interconnect.

* * * * *

UNITED STATES PATENT AND TRADEMARK OFFICE
CERTIFICATE OF CORRECTION

PATENT NO. : 8,499,141 B2
APPLICATION NO. : 12/848654
DATED : July 30, 2013
INVENTOR(S) : Robert C. Swanson et al.

It is certified that error appears in the above-identified patent and that said Letters Patent is hereby corrected as shown below:

In the Claims

In column 8, line 61, in claim 15, delete "claim." and insert -- claim --, therefor.

Signed and Sealed this
Fifteenth Day of October, 2013

Teresa Stanek Rea
*Deputy Director of the United States Patent and Trademark Office*